(12) United States Patent
Nemesh et al.

(10) Patent No.: US 7,975,757 B2
(45) Date of Patent: Jul. 12, 2011

(54) VEHICLE HVAC AND RESS THERMAL MANAGEMENT

(75) Inventors: Mark D. Nemesh, Troy, MI (US);
Matthew J. Martinchick, Farmington, MI (US); Kulwinder Singh, Lake Orion, MI (US); Wissam Ibri, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 561 days.

(21) Appl. No.: 12/176,432

(22) Filed: Jul. 21, 2008

(65) Prior Publication Data

US 2010/0012295 A1   Jan. 21, 2010

(51) Int. Cl.
*B60H 3/00* (2006.01)
*B60H 27/00* (2006.01)
(52) U.S. Cl. ............................................ 165/42; 165/43
(58) Field of Classification Search .................... 62/184, 62/185, 201, 244; 165/42, 43, 104.19, 202; 236/1 C, 34.5
See application file for complete search history.

(56) References Cited

U.S. PATENT DOCUMENTS

| | | | | |
|---|---|---|---|---|
| 5,291,960 A | * | 3/1994 | Brandenburg et al. | 180/65.27 |
| 5,528,901 A | * | 6/1996 | Willis | 60/626 |
| 5,549,153 A | * | 8/1996 | Baruschke et al. | 165/42 |
| 6,138,466 A | * | 10/2000 | Lake et al. | 62/199 |
| 6,357,541 B1 | * | 3/2002 | Matsuda et al. | 180/68.2 |
| 6,422,027 B1 | * | 7/2002 | Coates et al. | 62/259.2 |
| 6,464,027 B1 | * | 10/2002 | Dage et al. | 180/65.22 |
| 6,467,286 B2 | * | 10/2002 | Hasebe et al. | 62/185 |
| 7,007,491 B2 | * | 3/2006 | Grimm et al. | 62/230 |
| 7,043,931 B2 | * | 5/2006 | Plummer | 62/236 |
| 2001/0040061 A1 | | 11/2001 | Matuda et al. | |
| 2002/0184908 A1 | | 12/2002 | Brotz et al. | |
| 2003/0127528 A1 | | 7/2003 | Sabhapathy et al. | |
| 2005/0133215 A1 | * | 6/2005 | Ziehr et al. | 165/202 |
| 2005/0167169 A1 | | 8/2005 | Gering et al. | |

FOREIGN PATENT DOCUMENTS

FR         2884058 A1    10/2006

* cited by examiner

*Primary Examiner* — Frantz F Jules
*Assistant Examiner* — Emmanuel Duke

(57) ABSTRACT

A HVAC and RESS thermal management system and a method of operation for a vehicle having a passenger compartment, a power plant and a battery pack is disclosed. The system comprises a RESS coolant circuit and a power plant coolant circuit. The RESS coolant circuit directs a coolant through the battery pack and includes a pump, a coolant heating branch has a coolant-to-coolant heat exchanger, and a coolant routing valve that will selectively direct the coolant through the coolant heating branch. The power plant coolant circuit includes a heater core branch having a HVAC pump, a coolant heater, a heater core located in a HVAC module to provide heat to the passenger compartment, and the coolant-to-coolant heat exchanger, with the coolant-to-coolant heat exchanger providing heat transfer between the coolant in the coolant heating branch and the coolant in the heater core branch.

10 Claims, 2 Drawing Sheets

| Operating Mode | Operating Condition | 3-Way Valve Position | 4-way Valve Position | Result |
|---|---|---|---|---|
| Plugged-in | Battery Heating Only | 2 | 1 | Coolant Heater Used Exclusively for Battery Heating |
| Plugged-in | Passenger Compartment Preconditioning | 2 | 2 | Coolant Heater Used Exclusively for Passenger Compartment Preconditioning |
| Driving: Charge Depletion Mode | Passenger Compartment Heating Only | 2 | 2 | Coolant Heater Only Used for Passenger Compartment Heating |
| Driving: Charge-sustaining Mode (Power Plant Coolant Temp. < Minimum) | Passenger Compartment Heating Only | 2 | 2 | Coolant Heater Only Used for Passenger Compartment Heating |
| Driving: Charge-sustaining Mode (Power Plant Coolant Temp. >= Minimum) | Battery and Passenger Compartment Heating | 1 | Switching Between 1 and 2 | Engine Coolant Heat Used for Both Passenger Compartment and Battery Heating; Coolant Heater Activated as Needed |

FIG. 2

VEHICLE HVAC AND RESS THERMAL MANAGEMENT

BACKGROUND OF INVENTION

The present invention relates generally to heating, ventilation and air conditioning (HVAC) systems and thermal systems for rechargeable energy storage systems (RESS), such as battery packs, in vehicles.

Advanced automotive vehicles are being introduced that employ an RESS, such as a battery pack or other rechargeable energy storage means, to store large amounts of energy for electric propulsion systems. These vehicles may include, for example, plug-in hybrid electric vehicles, electric vehicles with an internal combustion engine that is used as a generator for battery charging, and fuel cell vehicles. In general, the RESS require some type of thermal system, and in particular for cooling and warming a battery pack in order to maximize the charging capacity and life of the battery pack.

Typical battery thermal systems used to cool and warm the battery pack rely on air flow from the vehicle HVAC system. This may be passenger cabin air that is directed through the battery pack. But these systems suffer from drawbacks such as low heat rejection due to the low heat transfer coefficient of air, interior passenger cabin noise, vibration and harshness (NVH) due to battery blower motor and air rush noise, limited battery cooling capacity after the vehicle has been parked in the sun (due to high air temperatures in the passenger cabin at the beginning of the drive cycle), and difficulty in ensuring that an air inlet grille between the passenger cabin and the battery thermal system does not get accidentally blocked by vehicle passengers (resulting in reduced or no battery air cooling flow). Others may employ a separate, dedicated battery pack coolant heater for warming a coolant before it is circulated through the battery pack. However, such separate systems tend to add to the cost, weight and complexity of the overall vehicle heating and cooling systems.

SUMMARY OF INVENTION

An embodiment contemplates a HVAC and RESS thermal management system for a vehicle having a passenger compartment, a power plant and a battery pack. The system may comprise a RESS coolant circuit and a power plant coolant circuit. The RESS coolant circuit may be configured to direct a coolant through the battery pack and include a pump for pumping the coolant through the RESS coolant circuit, a coolant heating branch having a coolant-to-coolant heat exchanger, and a controllable coolant routing valve that is actuatable to selectively direct the coolant through the coolant heating branch. The power plant coolant circuit may include a heater core branch, with the heater core branch having a HVAC pump for pumping the coolant through the heater core branch, a coolant heater, a heater core configured to be located in a HVAC module to provide heat to the passenger compartment, and the coolant-to-coolant heat exchanger, and with the coolant-to-coolant heat exchanger configured to provide heat transfer between the coolant in the coolant heating branch and the coolant in the heater core branch.

An embodiment contemplates a method of thermally controlling a passenger compartment and a battery pack of a vehicle having a power plant, the method comprising the steps of: detecting if a battery warming load is requested for the battery pack; if the battery warming load is requested, activating a HVAC coolant pump to pump a coolant through a heater core branch of a power plant coolant circuit including a coolant heater and a coolant-to-coolant heat exchanger and activating the coolant heater to warm the coolant flowing therethrough; and if the battery warming load is requested, activating a pump and setting a controllable coolant routing valve to direct the coolant through a coolant heating branch of a RESS coolant circuit including the battery pack and the coolant-to-coolant heat exchanger, whereby the coolant flowing through the coolant heating branch will absorb heat from the coolant flowing through the heater core branch in the coolant-to-coolant heat exchanger.

An embodiment contemplates a method of thermally controlling a passenger compartment and a battery pack of a vehicle having a power plant, the method comprising the steps of: detecting if a battery warming load is requested for the battery pack; detecting if a coolant temperature in the power plant is above a predetermined temperature threshold; detecting if a passenger compartment warming load is requested for the passenger compartment; if the coolant temperature in the power plant is not above the predetermined temperature threshold and the passenger compartment warming load is requested, activating a HVAC coolant pump to pump a coolant through a heater core branch of a power plant coolant circuit including a coolant heater, a heater core in a HVAC module and a coolant-to-coolant heat exchanger, activating the coolant heater to warm the coolant flowing therethrough, and activating a blower to cause air flow through the heater core; if the coolant temperature in the power plant is equal to or greater than the predetermined temperature threshold and the passenger compartment warming load is requested, activating the HVAC coolant pump to pump the coolant through the heater core branch, setting a valve to direct the coolant from the heater core branch through the power plant in a power plant branch and back to the heater core branch, and activating the blower to cause air flow through the heater core; and if the coolant temperature in the power plant is equal to or greater than the predetermined temperature threshold, the passenger compartment warming load is requested, and the battery warming load is requested, activating the HVAC coolant pump to pump the coolant through the heater core branch, setting a valve to direct the coolant from the heater core branch through the power plant in a power plant branch and back to the heater core branch, activating the blower to cause air flow through the heater core, activating a pump and setting a controllable coolant routing valve to direct the coolant through a coolant heating branch of a RESS coolant circuit including the battery pack and the coolant-to-coolant heat exchanger, whereby the coolant flowing through the coolant heating branch will absorb heat from the coolant flowing through the heater core branch in the coolant-to-coolant heat exchanger.

An advantage of an embodiment is that a single coolant heater can provide heating of coolant for both a heater core in a HVAC module and a battery pack in various vehicle modes of operation. Thus, coolant can be used for both passenger compartment heating and battery pack heating without the need for an additional coolant heater for a battery pack. This may save cost, weight and complexity for a HVAC and RESS thermal management system.

An advantage of an embodiment is that the coolant used to warm the battery pack is maintained separate from the coolant used in the power plant, thus protecting the coolant that flows through the battery pack from the potentially high temperatures and pressures, and debris that may be present in the coolant flowing through the power plant. This is accomplished even though there only needs to be one coolant heater in the overall system; and, even though heat absorbed by coolant flowing through the power plant can be used to warm the battery pack.

BRIEF DESCRIPTION OF DRAWINGS

FIG. 2 is a table showing operating states used in a method for meeting various thermal needs of the passenger cabin and RESS.

DETAILED DESCRIPTION

Figure 1:
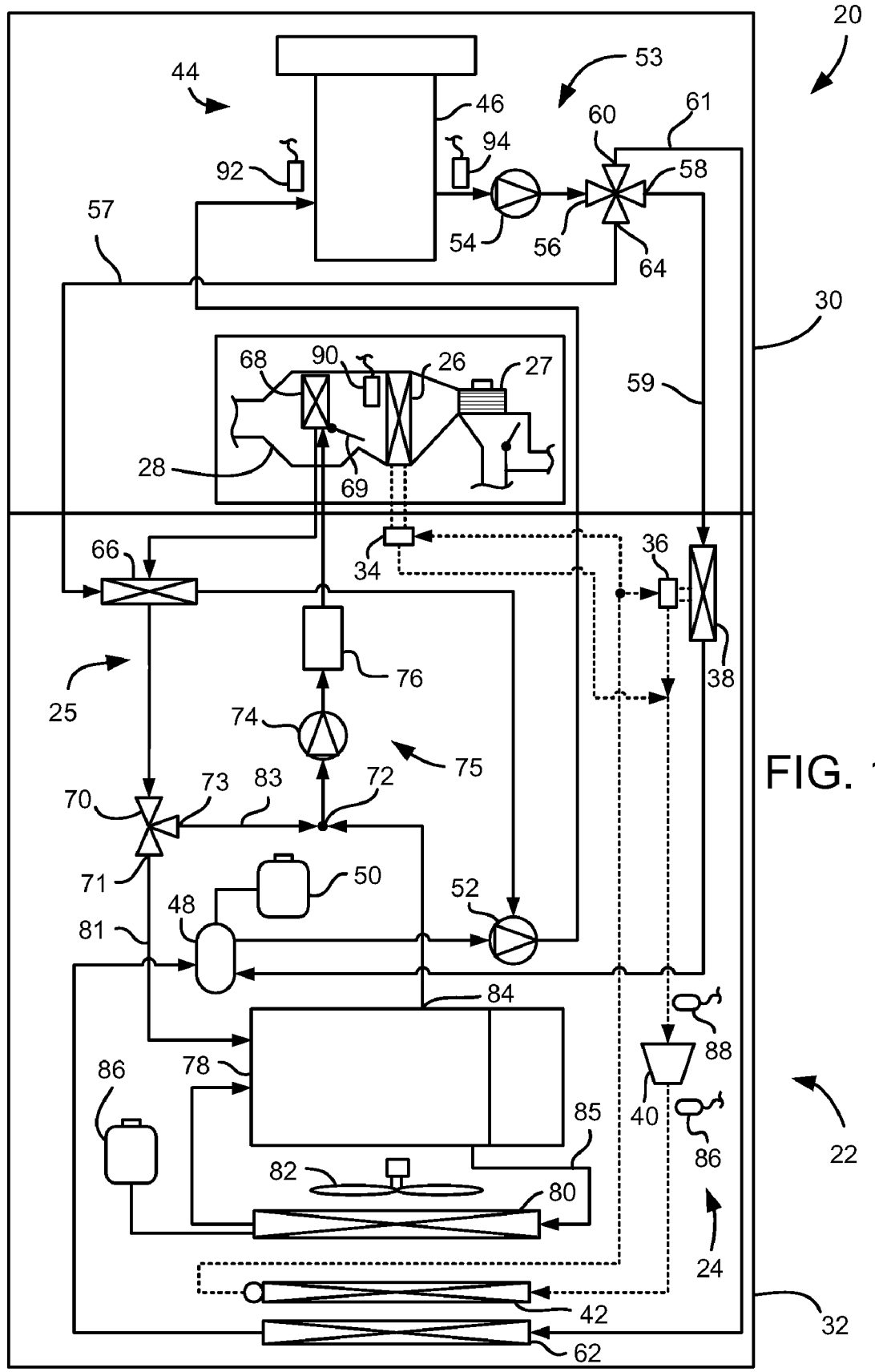
FIG. 1 is a schematic illustration of a vehicle having a HVAC and RESS thermal system.

Referring to FIG. 1, a portion of a vehicle, indicated generally at 20, includes a vehicle HVAC and RESS thermal management system 22. The system 22 includes an air conditioning portion 24 and a heating portion 25.

The air conditioning portion has an evaporator 26 in an HVAC module 28, which may be located in a passenger/cargo compartment 30, and other refrigerant system components, which may be located in an engine compartment 32 of the vehicle 20. A blower 27 may be located in the HVAC module 28 to selectively force air through the module 28. The other refrigerant system components may include an evaporator thermal expansion valve 34 (or other expansion device) controlling the flow of refrigerant through the evaporator 26, and a chiller thermal expansion valve 36 (or other expansion device) for controlling the flow of refrigerant through a refrigerant-to-coolant heat exchanger (chiller) 38. Refrigerant flowing through the expansion valves 34, 36 from the evaporator 26 and the chiller 38, is directed to a compressor 40 and then to a condenser 42. The dashed lines in FIG. 1 represent conduits through which refrigerant flows.

The chiller 38 also has a coolant that selectively flows through it. The coolant may be a conventional liquid mixture such as an ethylene glycol and water mix, or may be some other type of liquid with suitable heat transfer characteristics. Solid lines with arrows indicate coolant lines and the direction that coolant may flow through the lines under various operating modes.

The chiller 38 may be employed to cool the coolant with the refrigerant and route the coolant through a rechargeable energy storage system (RESS) 44, which may include, for example, a battery pack 46. The coolant may be directed from the chiller 38 to an air separator 48, where air is separated from the coolant into a RESS surge tank 50. A coolant pump 52 may then pump the coolant from the air separator 48 to the battery pack 46, where it flows through to absorb heat from the battery pack 46. Coolant flowing through the battery pack 46 is part of a RESS coolant circuit 53. An RESS pump 54 may pump the coolant from the battery pack 46 and direct it to a RESS four-way valve 56. A second outlet position 58 (position 2) on the four-way valve 56 directs the coolant back to the chiller 38.

A third outlet position 60 (position 3) on the four-way valve 56 directs coolant to a RESS radiator 62 and then back to the battery pack 46 via the air separator 48 and coolant pump 52. This third outlet position 60 and resultant coolant flow path may be employed when only a moderate amount of battery cooling is needed, thus eliminating the need to activate the refrigerant system.

A first outlet position 64 (position 1) on the four-way valve 56 directs coolant to a coolant-to-coolant heat exchanger 66. From the heat exchanger 66, the coolant is directed to the coolant pump 52 and then back to the battery pack 46. This heat exchanger 66 allows heat to be transferred into the coolant flowing through the battery pack 46 when needed without the need for a dedicated heater or heat source to warm the battery pack 46. The other coolant flowing through the heat exchanger 66 is received from a heater core 68 in the HVAC module 28 that is part of the heating portion 25 of the HVAC and RESS thermal management system 22. The coolant flowing through the heater core 68 is part of a power plant coolant circuit 75 and does not mix with the coolant in the RESS coolant circuit 53. The HVAC module may also include a blend door 69 the directs a proportion of the air through or around the heater core 68.

In effect, then, the RESS coolant circuit 53 includes three branches through which coolant can be directed by the four-way valve 56. The first outlet position 64 directs the coolant into a coolant heating branch 57 that directs the coolant through the coolant-to-coolant heat exchanger 66, the second outlet position 58 directs the coolant into a chiller branch 59 that directs the coolant through the chiller 38, and the third outlet position 60 directs the coolant into a RESS radiator branch 61 that directs the coolant through the RESS radiator 62. Alternatively, the chiller 38 and expansion valve 36 may be eliminated, thus making the chiller branch 59 merely a battery coolant bypass loop.

The power plant coolant circuit 75 also includes a three-way valve 70 that receives coolant from the heat exchanger 66 after flowing from the heater core 68. The three-way valve 70 may be switched to a second position 73 (position 2) to direct the coolant through a tee-fitting 72 to a HVAC coolant pump 74 and then through a coolant heater 76 back to the heater core 68. The coolant heater 76 may be any type of suitable assembly for heating the coolant as it flows through the coolant heater 76. The three-way valve 70 may also be switched to a first position 71 (position 1) to direct the coolant to a power plant 78. The power plant 78 may be, for example, an internal combustion engine or a fuel cell stack. The power plant 78 may have coolant lines extending to a radiator 80, which may be located adjacent to a cooling fan 82. A high temperature surge tank 86 may connect to the radiator 80 to allow for thermal expansion and contraction of the coolant. The power plant 78 also has a coolant outlet 84 the directs coolant to the tee-fitting 72. With this arrangement, heat can be supplied to coolant flowing through the heater core 68 from the coolant heater 76, the power plant 78 or both. And, since this coolant flows from the heater core 68 through the coolant-to-coolant heat exchanger 66, heat can also be provided to the coolant flowing through the battery pack 46 from the coolant heater 76, the power plant 78 or both.

In effect, then, the power plant coolant circuit 75 includes three branches, two of which coolant can be directed into by the three-way valve 70. The first outlet position 71 directs the coolant into a power plant branch 81 that directs the coolant into the power plant 78, and the second outlet position 73 directs the coolant into a heater core branch 83 that directs the coolant through the heater core 68. A third branch, the radiator branch 85, directs the coolant through the radiator 80. Flow through this branch 85 may be controlled by a thermostat (not shown) and pumped through this branch by a water pump (not shown).

The HVAC and RESS thermal management system 22 may also include various sensors for detecting a temperature or pressure at certain points in the system. For example, the HVAC and RESS thermal management system 22 may include a high side pressure sensor 86 for measuring the refrigerant pressure just after the refrigerant exits the compressor 40 and a low side pressure sensor 88 for measuring the refrigerant pressure before the refrigerant enters the compressor 40. An evaporator air temperature sensor 90 may be employed to measure the temperature of air flowing out of the evaporator 26. Also, a first coolant temperature sensor 92 may be employed to measure the temperature of coolant upstream of the battery pack 46 and a second coolant temperature sensor 94 may be employed to measure the temperature of coolant just after exiting the battery pack 46.

FIG. 2 illustrates a table showing some of the possible operating states used in a method for meeting various thermal needs of the passenger/cargo compartment 30 and RESS 44 illustrated in FIG. 1. The need for cooling and heating of the RESS 44 may be dependent upon ambient conditions, current electric power usage, as well as the current temperature of the RESS, which can be different than the current passenger compartment cooling or heating load.

For the first operating mode listed in FIG. 2, the vehicle is plugged-in (i.e., battery pack charging while the vehicle 20 is parked) in cold ambient operating conditions where warming of the battery pack 46 is desirable during charging. In this mode, the three-way valve 70 is switched to the second position 73 and the four-way valve 56 is switched to the first outlet position 64. Also, the HVAC coolant pump 74, the coolant heater 76, and one or both of the coolant pump 52 and the RESS pump 54 are activated. Thus, the HVAC coolant pump 74 pumps coolant through the power plant coolant circuit 75 by pumping it through the coolant heater 76, where it is warmed, with the coolant then flowing through the heater core 68 (where little heat is lost since the blower 27 is not activated). This coolant then flows through the coolant-to-coolant heat exchanger 66, and through the three-way valve 70, where it is directed through the second outlet 73, and through the tee-fitting 72 back to the pump 74. In addition, coolant is pumped through the RESS coolant circuit 53 by pumping it from the battery pack 46 through the first outlet 64 of the four-way valve 56 and through the coolant-to-coolant heat exchanger 66, where it absorbs heat from the coolant flowing from the heater core 68 that has just been warmed by the coolant heater 76. The warmed coolant is then directed back to the battery pack 46, where it warms the battery pack 46. Thus, the energy from the coolant heater 76 is used exclusively for warming the battery pack 46 in this mode-even though the coolant flowing through the coolant heater 76 does not flow through the battery pack 46.

For the second operating mode listed in FIG. 2, the vehicle is plugged-in (i.e., battery pack charging while the vehicle 20 is parked) in cold ambient operating conditions where warming of the battery pack 46 is desirable during charging, and a request for passenger compartment preconditioning has been received. Passenger compartment preconditioning is where, prior to entering the vehicle, an operator requests warming of the passenger compartment 30. In this mode, the three-way valve 70 is switched to the second position 73 and the four-way valve 56 is switched to the second outlet position 58. Also, the HVAC coolant pump 74, the coolant heater 76 and the blower 27 are activated, with the blend door 69 moved to direct all or almost all of the air flow from the blower 27 through the heater core 68. Thus, the HVAC coolant pump 74 pumps coolant through the coolant heater 76, where it is warmed, with the coolant then flowing through the heater core 68. As the coolant flows through the heater core 68, the air flowing through the HVAC module 28 will absorb heat from the heater core 68. This coolant then flows through the coolant-to-coolant heat exchanger 66, and through the three-way valve 70, where it is directed through the second outlet 73, and through the tee-fitting 72 back to the pump 74. Since coolant is not flowing through the coolant-to-coolant heat exchanger 66 from the battery pack 46, the coolant flowing from the heater core 68 is not cooled by this heat exchanger 66. Thus, the energy from the coolant heater 76 is used exclusively for warming the passenger compartment 30 in this mode. Also, since the vehicle 20 is not operating, this mode preferably has a time limit where it ceases operation within a certain amount of time if the vehicle operator does not enter and start the vehicle 20. Such a time interval may be, for example, ten minutes.

For the third operating mode listed in FIG. 2, the vehicle is being operated (i.e., driven) in a charge depletion mode, with the power plant 78 not operating. In this operating mode where the battery charge is being depleted, the operating condition for the HVAC and RESS thermal management system 22 is to provide passenger compartment heating only-not battery heating as well. In this mode, the three-way valve 70 is switched to the second position 73 and the four-way valve 56 is switched to the second outlet position 58. Also, the HVAC coolant pump 74, the coolant heater 76 and the blower 27 are activated, with the blend door 69 moved to direct all or almost all of the air flow from the blower 27 through the heater core 68. The HVAC coolant pump 74 pumps coolant through the coolant heater 76, where it is warmed, with the coolant then flowing through the heater core 68. As the coolant flows through the heater core 68, the air flowing through the HVAC module 28 will absorb heat from the heater core 68. This coolant then flows through the coolant-to-coolant heat exchanger 66, and through the three-way valve 70, where it is directed through the second outlet 73, and through the tee-fitting 72 back to the pump 74. Since coolant is not flowing through the coolant-to-coolant heat exchanger 66 from the battery pack 46, the coolant flowing from the heater core 68 is not cooled by this heat exchanger 66. Thus, the energy from the coolant heater 76 is used exclusively for warming the passenger compartment 30 in this mode.

For the fourth operating mode listed in FIG. 2, the vehicle is being operated (i.e., driven) in a charge sustaining mode, with the power plant 78 operating to charge the battery pack 46, but with the temperature of the coolant flowing through the power plant 78 below a predetermined minimum temperature threshold. Since the coolant in the power plant loop is not warm enough to provide heating, the coolant flowing through the power plant loop remains isolated from the coolant flowing through the heater core 68, as is the case with the second and third operating modes. Again, the coolant heater 76 provides the heating for the passenger compartment 30, with the valves and pumps operating the same as in the third operating mode, so that the HVAC and RESS thermal management system 22 is providing passenger compartment heating only.

For the fifth operating mode listed in FIG. 2, the vehicle is being operated (i.e., driven) in a charge sustaining mode, with the power plant 78 operating to charge the battery pack 46, but with the temperature of the coolant flowing through the power plant 78 equal to or above a predetermined minimum temperature threshold. Since the coolant in the power plant loop is warm enough to provide heating, the coolant flowing through the power plant coolant circuit 75 is also directed through the heater core 68 and the coolant-to-coolant heat exchanger 66. With this additional heating capacity, there is enough heat produced by this HVAC system operating condition to provide both passenger compartment and battery heating.

Accordingly, the three-way valve 70 is switched to the first position 71 and the four-way valve 56 is switched between the first outlet position 64 and the second outlet position 58. Also, the HVAC coolant pump 74, the blower 27, and one or both of the coolant pump 52 and the RESS pump 54 are activated. The HVAC coolant pump 74 pumps coolant through the coolant heater 76 and the heater core 68. As the coolant flows through the heater core 68, the air flowing through the HVAC module 28 will absorb heat from the heater core 68 to provide heat to the passenger compartment 30. This coolant then flows through the coolant-to-coolant heat exchanger 66, and through the three-way valve 70, where it is directed through the first outlet 71, and into the power plant 78. The coolant absorbs heat while in the power plant 78 and is then directed out through the coolant outlet 84, through the tee-fitting 72 and back to the pump 74—completing the power plant coolant circuit 75. When the battery pack 46 needs to be warmed, the four-way valve 56 is actuated to direct coolant through the first outlet position 64, so the coolant will be directed through the coolant-to-coolant heat exchanger 66. This coolant will absorb heat from the coolant flowing from the heater core 68, and is then directed back through the battery pack 46—completing the RESS coolant circuit 53. Thus, heat from the power plant 78 is used for both passenger compartment and battery pack heating.

Since, in this fifth operating mode, the battery pack 46 may not need as much heat as the passenger compartment 30, the four-way valve may be cycled at times to direct coolant through the second outlet 58. In this way, the coolant-to-coolant heat exchanger 66 is bypassed, so no heat is provided to the coolant flowing through the battery pack 46 even though heat is still provided to the passenger compartment 30. Alternatively, the difference in heating can be controlled by setting the four-way valve 56 to allow for a portion of the coolant to be directed through the first outlet 64 and the other portion of the coolant to be directed through the second outlet 58, rather than cycling the valve 56 back and forth. This alternative, of course, would require the use of a valve that can allow for proportioned flow control.

In addition, in this fifth operating mode, the coolant heater 76 may be activated as needed to supplement the heat provided to the coolant by the power plant 78. This may occur, for example, in low ambient temperature conditions or when the power plant 78 is a fuel cell (as opposed to an internal combustion engine).

Other modes, may include modes where passenger compartment and/or battery cooling is required. In these modes, the compressor 40, chiller 38 and/or RESS radiator 62 may be employed to provide the desired cooling, with the valves and pumps activated accordingly.

While certain embodiments of the present invention have been described in detail, those familiar with the art to which this invention relates will recognize various alternative designs and embodiments for practicing the invention as defined by the following claims.

What is claimed is:

1. A HVAC and RESS thermal management system for a vehicle having a passenger compartment, a power plant and a battery pack, the system comprising:
    a RESS coolant circuit configured to direct a coolant through the battery pack and including a pump for pumping the coolant through the RESS coolant circuit, a coolant heating branch having a coolant-to-coolant heat exchanger, and a controllable coolant routing valve that is actuatable to selectively direct the coolant through the coolant heating branch; and
    a power plant coolant circuit including a heater core branch, the heater core branch having a HVAC pump for pumping the coolant through the heater core branch, a coolant heater, a heater core configured to be located in a HVAC module to provide heat to the passenger compartment, and the coolant-to-coolant heat exchanger, the coolant-to-coolant heat exchanger configured to provide heat transfer between the coolant in the coolant heating branch and the coolant in the heater core branch; the RESS coolant circuit includes a chiller branch including a chiller, with the controllable coolant routing valve actuatable to selectively direct the coolant through the chiller branch, bypassing the coolant-to-coolant heat exchanger, and actuatable to selectively direct the coolant through the coolant heating branch; and the RESS coolant circuit includes a RESS radiator branch including a RESS radiator, with the controllable coolant routing valve actuatable to selectively direct the coolant through the RESS radiator branch, bypassing the coolant-to-coolant heat exchanger, actuatable to selectively direct the coolant through the chiller branch, and actuatable to selectively direct the coolant through the coolant heating branch.

2. The system of claim 1 wherein the power plant coolant circuit includes a power plant branch configured to direct the coolant through the power plant and a controllable heating circuit coolant routing valve that is actuatable to selectively direct the coolant through the power plant branch and to selectively bypass the power plant branch.

3. The system of claim 1 wherein the chiller is configured to accept a refrigerant flow therethrough that is adapted to absorb heat from the coolant flowing through the chiller.

4. The system of claim 1 wherein the RESS coolant circuit includes an air separator that is in fluid communication with at least one of the RESS radiator branch and the chiller branch.

5. The system of claim 1 wherein the RESS coolant circuit includes a RESS radiator branch including a RESS radiator, with the controllable coolant routing valve actuatable to selectively direct the coolant through the RESS radiator branch, bypassing the coolant-to-coolant heat exchanger, and actuatable to selectively direct the coolant through the coolant heating branch.

6. The system of claim 1 including a first coolant temperature sensor configured to measure a coolant temperature just upstream of the battery pack and a second coolant temperature sensor configured to measure the coolant temperature just downstream of the battery pack.

7. A method of thermally controlling a passenger compartment and a battery pack of a vehicle having a power plant, the method comprising the steps of:
    (a) detecting if a battery warming load is requested for the battery pack;
    (b) if the battery warming load is requested, activating a HVAC coolant pump to pump a coolant through a heater core branch of a power plant coolant circuit including a coolant heater and a coolant-to-coolant heat exchanger and activating the coolant heater to warm the coolant flowing therethrough; and
    (c) if the battery warming load is requested, activating a pump and setting a controllable coolant routing valve to direct the coolant through a coolant heating branch of a RESS coolant circuit including the battery pack and the coolant-to-coolant heat exchanger, whereby the coolant flowing through the coolant heating branch will absorb heat from the coolant flowing through the heater core branch in the coolant-to-coolant heat exchanger; and (d) detecting if a battery cooling load is requested for the battery pack; (e) if a battery cooling load is detected and the battery cooling load is a relatively lower amount of cooling, activating the pump, and setting the controllable coolant routing valve to bypass the coolant heating branch and direct the coolant through a RESS radiator in a RESS radiator branch of the RESS coolant circuit; and (f) if battery cooling load is detected and the battery cooling load is a relatively higher amount of cooling, activating the pump, setting the controllable coolant routing valve to bypass the coolant heating branch and direct the coolant through a chiller in a chiller branch of the RESS coolant circuit, and activating a refrigerant compressor to cause cooled refrigerant to flow through the chiller to thereby absorb heat from the coolant flowing through the chiller.

8. The method of claim 7 wherein step (b) is further defined by: if the battery warming load is requested, then pumping the coolant through a heater core that is in the heater core branch and is located in a HVAC module.

9. The method of claim 7 including:
(g) detecting if a coolant temperature in the power plant is above a predetermined temperature threshold; and
(h) if the coolant temperature in the power plant is equal to or greater than the predetermined temperature threshold and the battery warming load is requested, activating the HVAC coolant pump to pump the coolant through a heater core branch of a power plant coolant circuit including a coolant-to-coolant heat exchanger, setting a valve to direct the coolant from the heater core branch through the power plant in a power plant branch and back to the heater core branch, and activating the pump and setting the controllable coolant routing valve to direct the coolant through the coolant heating branch, whereby the coolant flowing through the coolant heating branch will absorb heat from the coolant flowing through the heater core branch in the coolant-to-coolant heat exchanger.

10. The method of claim 9 including:
(i) detecting if a passenger compartment warming load is requested for the passenger compartment; and
(j) if the coolant temperature in the power plant is equal to or greater than the predetermined temperature threshold and the passenger compartment warming load is requested, activating the HVAC coolant pump to pump the coolant through the heater core branch, setting the valve to direct the coolant from the heater core branch through the power plant in the power plant branch and back to the heater core branch, and activating the blower to cause air flow through the heater core.

\* \* \* \* \*